July 8, 1930.   G. D. SUNDSTRAND   1,770,048
AUTOMATIC LATHE
Original Filed Oct. 1, 1924   2 Sheets-Sheet 1

Inventor:
G. D. Sundstrand,
By Chindahl Parker & Carlson
Attys.

July 8, 1930. G. D. SUNDSTRAND 1,770,048
AUTOMATIC LATHE
Original Filed Oct. 1, 1924 2 Sheets-Sheet 2
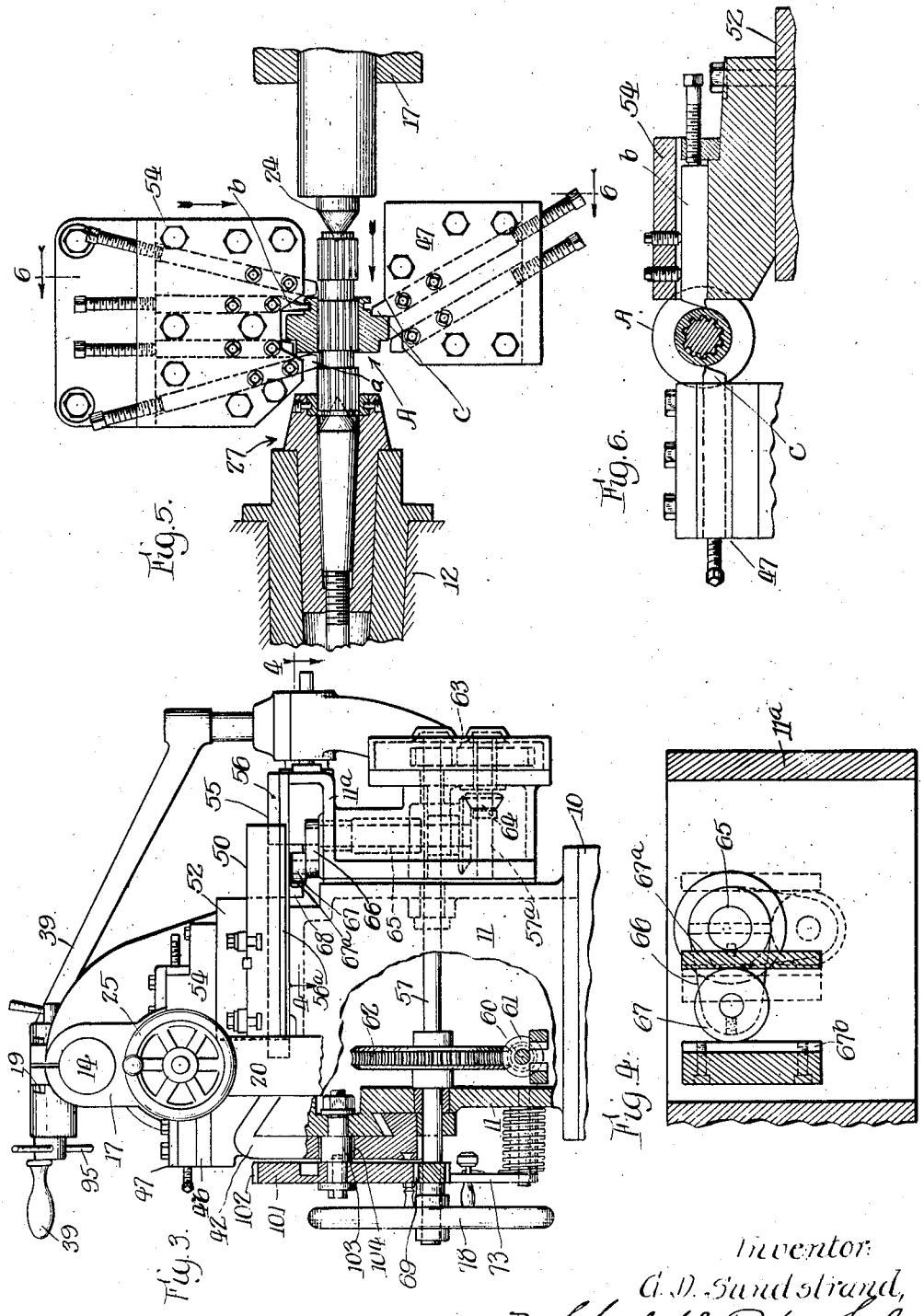
Inventor
G. D. Sundstrand,
By Chindahl, Parker & Enelow
Attys.

Patented July 8, 1930

1,770,048

UNITED STATES PATENT OFFICE

GUSTAF DAVID SUNDSTRAND, OF ROCKFORD, ILLINOIS, ASSIGNOR TO SUNDSTRAND MACHINE TOOL CO., OF ROCKFORD, ILLINOIS, A CORPORATION OF ILLINOIS

AUTOMATIC LATHE

Application filed October 1, 1924, Serial No. 740,913. Renewed November 23, 1929.

The invention relates to lathes of a type which is particularly adapted for use in the manufacture of parts upon which a plurality of machining operations must be performed, and has especial reference to lathes having tools mounted on front and rear carriages to perform automatically a relatively large number of operations with each insertion of the work. Usually it is possible to perform these operations simultaneously, or substantially so, but I have found that in some instances, this is impractical because of the nature of the work. For example, in the case of a clutch shifting gear requiring turning, facing and grooving operations, the turning operation must be performed before the grooving operation commences. In machines now in use, the successive turning and grooving operations are performed under the manual control of the operator.

The object of my invention, generally stated, is to provide in an automatic lathe of the character set forth; means operating to control the movements of front and rear tool carriages so that the operation of one or more of the cutting tools on one carriage may be timed relative to the operation of the cutting tools on the other carriage, to the end that operations of varying character may be performed successively in a single insertion or placement of the work in the machine.

More specifically stated, the object of my invention is to provide in an automatic lathe a common driving means for front and rear tool carriages and operative connections between said driving means and the respective carriages whereby to effect an interruption or dwell in the feeding movement of one of the carriages while the feeding movement of the second carriage continues for the purpose of performing one or more final operations.

For convenience I have herein shown and will describe my invention as applied to the machining of a clutch shifting gear, although it will be apparent that the invention is capable of wide application.

Figure 1 of the drawings is a front elevational view of a lathe embodying my invention.

Fig. 3 is a fragmentary end view of the lathe.

Fig. 4 is a horizontal sectional view taken approximately in the plane of line 4—4 of Fig. 3 but on an enlarged scale to show the operative connection between the drive mechanism and the rear tool carriage.

Fig. 5 is a fragmentary horizontal section showing the front and rear tool holders in plan view.

Fig. 6 is a horizontal section taken approximately in the plane of line 6—6 of Fig. 5.

Figure 1:
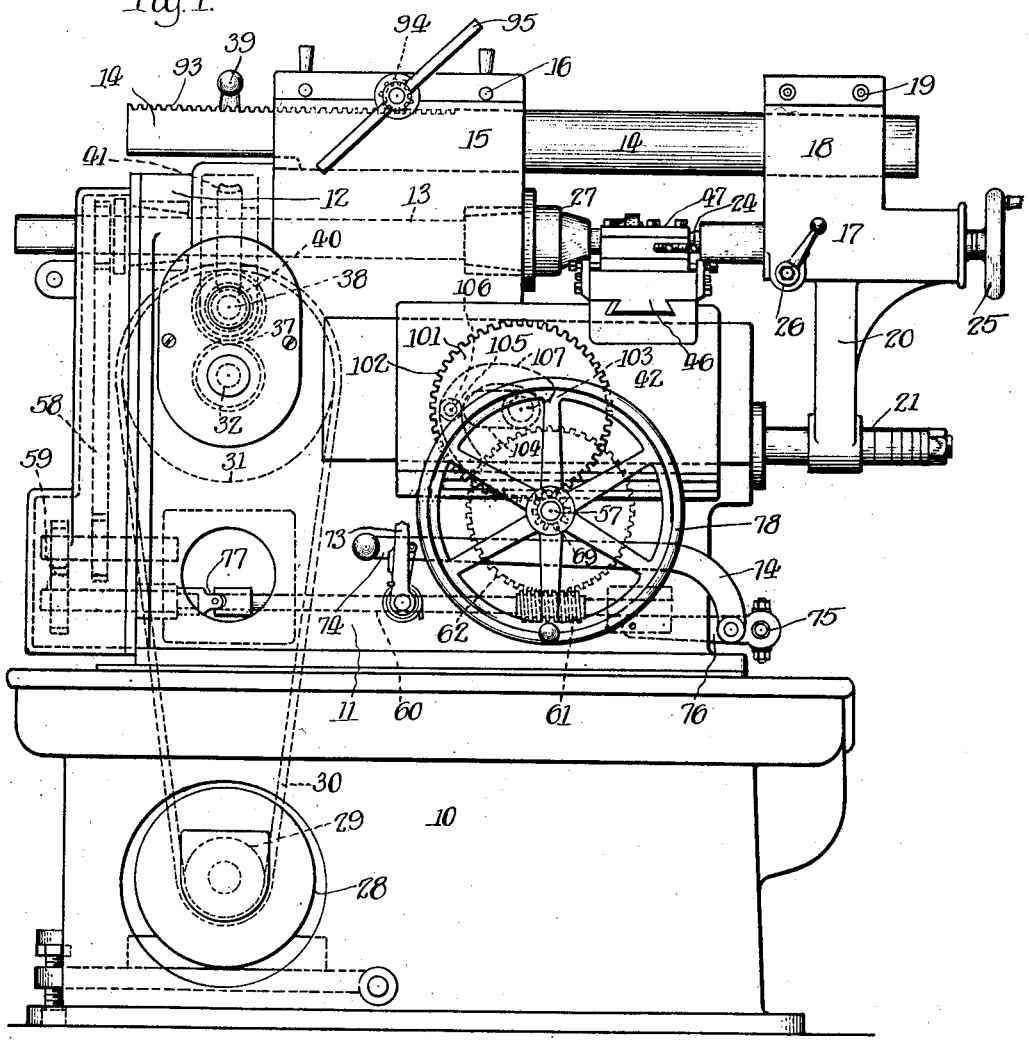

The lathe comprises a hollow base 10 upon which is supported a body 11 of substantial height at one end, forming in effect a column, and lower at its other end to form a bed. The upper portion of the column forms a stationary headstock 12 in which a work-supporting spindle 13 is journalled, and above the spindle is mounted a shaft 14 which extends longitudinally over the bed. This shaft is made of substantial size, forming a rigid overarm, and is securely clamped in the extreme upper end of the column by means of a split bearing 15 formed integral with the headstock and having clamping bolts 16.

At the opposite end of the bed I provide a tailstock 17 which is so mounted as to constitute a connection between the overarm and the lathe bed. Thus the tailstock has in its upper portion a split bearing 18 equipped with clamping bolts 19 whereby the tailstock may be rigidly clamped upon the overarm. Also the tailstock has a depending portion 20 which is adjustably mounted upon a stud 21 projecting outwardly from the bed. This construction while providing an effectual support for the tailstock also provides a support for the free end of the overarm. The tailstock may be provided with a center 24 adjustable in the usual way by means of a hand wheel 25 and arranged to be locked by the clamping screw 26.

The spindle 13 may be provided with suitable means for holding the work A, herein shown as a clutch shifting gear. I have shown in the present instance for this purpose a chuck 27 of a well known character.

Enclosed within the base 10 is an electric motor 28 which I prefer to employ as the source of power. This motor is connected with the spindle 13 by means of a pulley 29, a belt 30, a pulley wheel 31 mounted upon a shaft 32, and a pair of intermeshing gears 37. One of these gears is fastened upon the shaft 32 and the other is mounted upon a parallel shaft 38 which also carries a worm 40 meshing with a worm wheel 41 fast upon the spindle 13. A suitable shifting clutch (not herein shown) having an operating handle 39 (Fig. 3) may be interposed between the pulley wheel 31 and its driving connection with the spindle.

Movable longitudinally of the lathe bed, in a direction parallel to the spindle, is a front tool carriage 42 mounted upon suitable ways and having a table 46 mounted thereon for transverse movement. The table in turn may support a suitable tool holder 47 adapted to carry tools c which in the longitudinal movement of the carriage perform turning and facing operations on the work A.

Also mounted upon the lathe, for movement transversely thereof in a plane somewhat below the axis of the work, is a rear tool carriage 50 carrying a table 52 adjustable in a direction longitudinally of the bed and in turn supporting a tool holder 54 which is adjustable transversely. As shown in Fig. 3, the carriage 50 is mounted to slide upon a plate 55 rigidly secured upon the body 11 and constructed to provide undercut ways 56 adapted to be engaged by gib-plates 56ᵃ secured to the underside of the carriage at opposite sides thereof. Beneath the rear end of the slide plate 55, there is secured to the body 11 a gear housing 11ᵃ having its upper end extending outwardly and upwardly to form with the slide plate and the rear side of the body a chamber for enclosing the feed mechanism for the carriage 50, to be presently described.

The mechanism for moving the carriages 42 and 50 is arranged to be driven from a common actuating means including a shaft 57 mounted transversely in the body 11 (Fig. 3) and operatively connected with the spindle 13 by means of a chain and sprocket connection 58 (Fig. 1), change speed gears 59, a shaft 60, a worm 61, and a worm wheel 62, the latter being fast upon the forward end of the shaft 57.

The means for moving the carriage 50 is operatively connected with the rear end of the shaft 57 (Fig. 3) through the medium of a pair of spur gears 63, bevel gears 64 and a vertical shaft 65 journalled in the gear housing 11ᵃ. One of the gears 63 is fast upon the shaft 57 and the other is fast upon a countershaft 57ᵃ which also carries one of the bevel gears 64, the other one of said bevel gears being fast upon the lower end of the shaft 65.

The means for imparting motion to the carriage 50 comprises in this instance a crank arm 66 fast upon the upper end of the shaft 65 and carrying a roller 67 operatively engaging with the carriage 50 through the medium of a portion 68 depending through a suitable opening in a slide plate 56. The depending portion 68 is constructed to provide a groove 67ᵃ which extends longitudinally of the bed, parallel with the work spindle. Preferably the forward wall of the groove 67ᵃ is provided with a hardened wear plate 67ᵇ.

The arrangement of the parts is such that when the carriage is in its normal rearward position, the crank arm 66 extends in a general longitudinal direction with respect to the lathe bed (broken lines Fig. 4), and it will therefore be apparent that in the initial operation of the crank arm in a clockwise direction, the carriage 50 will be caused to move forwardly at a relatively high speed; but that as the crank arm approaches a transverse position (full lines Fig. 4) the rate of movement of the carriage is substantially reduced. I take advantage of this variation in the rate of movement of the carriage by so mounting the facing tools a that they perform the major portion of their facing operation during the movement of the carriage at relatively high speed; and by so mounting the grooving tool b that it performs its operation at the slower rate of feeding movement.

The front carriage 42 is also actuated from the shaft 57 through the medium of a pinion 69 on the forward end of the shaft 57 (Figs. 1 and 3) having an operative connection with the carriage as will presently be described, to move it. Suitable means (not shown) may be provided for stopping the feeding operation at a predetermined point in the travel of the carriage by disengaging a latch member 73 which normally supports the free end of a lever 74 pivoted at 75. This lever has rigid therewith an arm 76 which pivotally supports a bearing for the free end of the shaft 60 upon which the worm 61 is mounted. In said shaft 60 is interposed a universal coupling 77 which, when the latch member 73 is disengaged to release the lever 74, permits the worm 61 to disengage from the worm wheel 62. It will be apparent that since the rear tool carriage is driven from the shaft 57 as is also the front tool carriage, when this tripping operation takes place, the entire feeding mechanism is brought to a stop.

Figure 2:
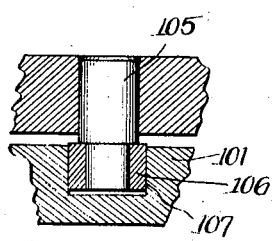
Fig. 2 is a fragmentary sectional view on an enlarged scale showing a detail of construction.

Referring now to Figs. 1, 2 and 3, the connection between the drive mechanism and the front tool carriage is adapted to accomplish the feeding of the front tools into engagement with the work and upon the completion of their several operations to interrupt such feeding movement while the rear tool carriage is fed to perform the grooving operation. To this end I provide a cam disk 101 having teeth 102 on its periphery meshing with the pinion 69 near the forward end of the shaft 57, this shaft being equipped with a hand wheel 78 as shown in Fig. 3. The disk 101 is mounted on the front wall of the bed 11 through the medium of a stud shaft 103 which passes through an elongated slot 104 in the front tool carriage which permits the carriage to move longitudinally relative to the shaft 103. Near one end of the slot 104, the carriage has a forwardly projecting stud 105 carrying a roller 106 at its forward end which engages in a groove 107 in the cam disk 101. This groove 107 (Fig. 1) is shaped so that in the initial portion of the rotation of the disk in a clockwise direction, a movement to the left is imparted to the carriage such that the tools *c* thereon (Fig. 5) immediately perform their respective turning operations. Thereupon the feeding movement of the front tool carriage 42 ceases, the roller 106 at this point entering a dwell in the groove 107, while in the continued operation of the drive mechanism the rear tool carriage continues its feeding movement during which the grooving tool *b* performs its operation. Thus it will be apparent that the turning operations are performed by the tools *c* prior to the engagement of the grooving tool *b* with the work, and that the feeding movement of the tools *c* is interrupted during the operation of the grooving tool. The facing tools *a* on the rear tool carriage, it will be understood are located in advance of the tool *b* so that these may be performing their operation while the tools *c* are performing their respective turning operations.

As a means for adjusting the tailstock 18, the overarm 14 is preferably adjustable in the headstock 15 through the medium of rack teeth 93 formed upon the upper side of the overarm and a pinion 94 mounted in the headstock and operable by a cross bar 95 rigid therewith.

It will be noted that because of the character of the operative connection between the drive mechanism and the rear tool carriage, the latter moves at a relatively slow speed during the final portion of its feeding movement, during which the grooving tool *b* performs its operation. This final movement of the rear tool carriage, moreover, takes place when the crank arm 66 moves toward the position shown in full lines in Fig. 4, in which the transmission of power to the carriage is most effective. In the initial portion of the feeding movement of this carriage, the rate of travel is relatively high and during such movement the cutting tools *a* perform their facing operations. These latter, as is well known, require the application of considerably less power than in the case of the turning or grooving tools *b* and *c*. The result is therefore that by the arrangement which I have provided, the turning operations performed respectively by the tools *c* and *b* occur at different times in the operating period, the tools *c* performing their operations first and the tool *b* performing its operation last. The facing operations are performed by the tools *a* during the entire operating period.

It will also be seen that the construction which I have provided is relatively simple in character. The use of the common drive mechanism for the two carriages renders necessary the use of only a single trip mechanism, while the operative connection between the drive mechanism and the front carriage provides for the independent movement of the rear carriage.

I claim as my invention:

1. An automatic lathe having means for rotatably supporting the work, front and rear tool carriages respectively mounted for longitudinal and transverse feeding movements on opposite sides of the work, a common drive mechanism, and operative connections between said drive mechanism and the respective carriages, one of said connections including a crank arm adapted initially to move the corresponding carriage at a relatively high speed and finally at a relatively low speed, and the other one of said connections comprising cam means operating to complete approximately the movement of its corresponding carriage during the initial high speed movement of the other carriage.

2. A lathe having, in combination, a bed, means for supporting the work above the bed, a front tool carriage mounted for longitudinal movement on the forward side of the bed, a shaft extending transversely through the bed below the carriage and projecting forwardly from the bed, a disk mounted upon the forward side of the bed, said disk having a gearing connection with said shaft to be rotated thereby, and a connection between said disk and the bed including a roller on one of the parts, the other one of the parts having a groove receiving said roller and adapted to impart feeding motion to the carriage during a portion only of the movement of the disk by said shaft.

3. A lathe having a bed, a front tool carriage mounted for longitudinal movement on the forward side of the bed, a rear tool carriage mounted for transverse movement upon the upper side of the bed, a drive mechanism including a shaft extending transversely of the bed, operative connections between said shaft and the respective carriages to move them, one of said connections being adapted to interrupt the travel of its corresponding carriage while the other carriage continues to move, the other of said connections including a stroke changing device comprising alterable change gears.

4. A lathe having, in combination, means for rotatably supporting the work, a longitudinally movable front tool carriage, a transversely movable rear tool carriage, a drive mechanism and means actuated by said drive mechanism for moving said carriages, said means comprising a cam disk for moving the front carriage, a roller on the front carriage operated by said disk, a crank arranged to reciprocate said rear tool carriage, and a driving connection between said cam disk and crank including alterable change gears.

5. An automatic lathe having, in combination, a bed, means thereon for rotatably supporting the work, a longitudinally movable front tool carriage, a transversely movable rear tool carriage, a common drive mechanism for said carriages, a connection between said drive mechanism and the front tool carriage including a cam device, a connection between said drive mechanism and rear tool carriage including a crank arranged to reciprocate said carriage, and a pair of alterable change gears arranged to permit of substitution for adjusting the timing and strokes of said carriages.

6. An automatic lathe having, in combination, means for rotatably supporting the work, a longitudinally movable front tool carriage, a transversely movable rear tool carriage, a common reversible drive shaft, operative connections between said drive shaft and the respective carriages, one of said connections including a crank arm adapted initially to move the corresponding carriage at a relatively high speed and finally at a relatively low speed, the other one of said connections comprising cam means operating to complete approximately the movement of its carriage during the initial high speed movement of the other carriage, and a set of alterable change gears in one of said connections adapted to permit of substitution for adjusting the strokes of the carriages.

7. A lathe having, in combination, a bed, means for rotatably supporting the work on said bed, a longitudinally movable front tool carriage, a rear tool carriage, a common drive shaft for said carriages, a connection between said drive shaft and the front tool carriage comprising a cam disk and a follower, one of which is mounted upon the bed and the other upon the front carriage, and a connection between said shaft and the rear carriage comprising a device for actuating said carriage and a set of alterable change gears arranged to permit of substitution for adjusting the strokes of said carriages.

8. A lathe having, in combination, a bed, means for rotatably supporting the work on said bed, front and rear tool carriages movably mounted on said bed, a common drive shaft for said carriages, a connection between said drive shaft and the front tool carriage comprising a rotatable cam disk and a follower, one of which is mounted upon the bed and the other upon the front carriage, said cam disk having a dwell portion to maintain said front carriage stationary during a part of the rotative movement of said disk, and a connection between said shaft and the rear carriage comprising a device for actuating said carriage and a set of alterable change gears arranged to permit of substitution for adjusting the strokes of said carriages.

In testimony whereof, I have hereunto affixed my signature.

GUSTAF DAVID SUNDSTRAND.